May 26, 1953  G. T. REICH  2,639,898
APPARATUS AND METHOD FOR MIXING FOOD PRODUCTS
Filed Jan. 14, 1948  4 Sheets-Sheet 2
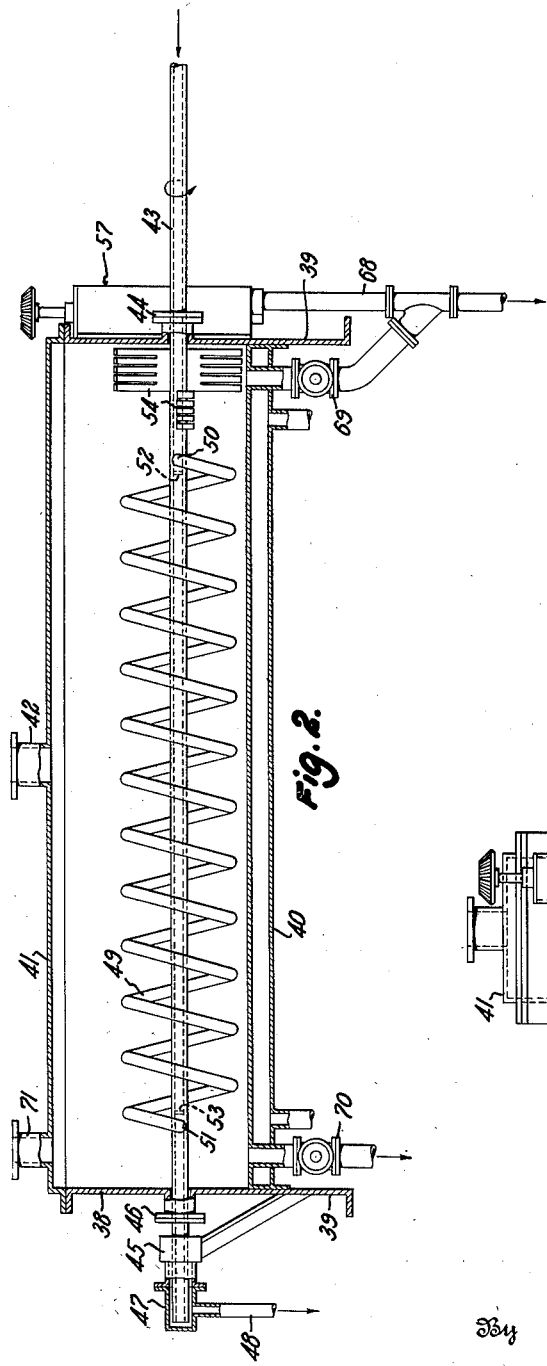
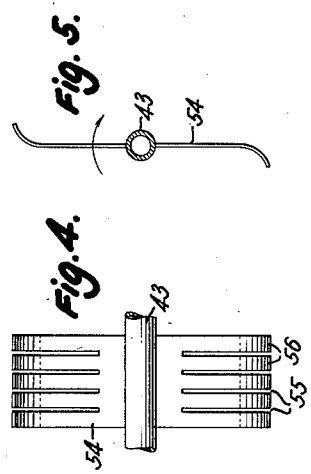
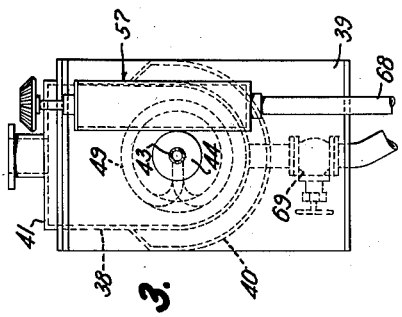
Inventor
Gustave T. Reich.
By Stowell & Evans,
Attorneys.

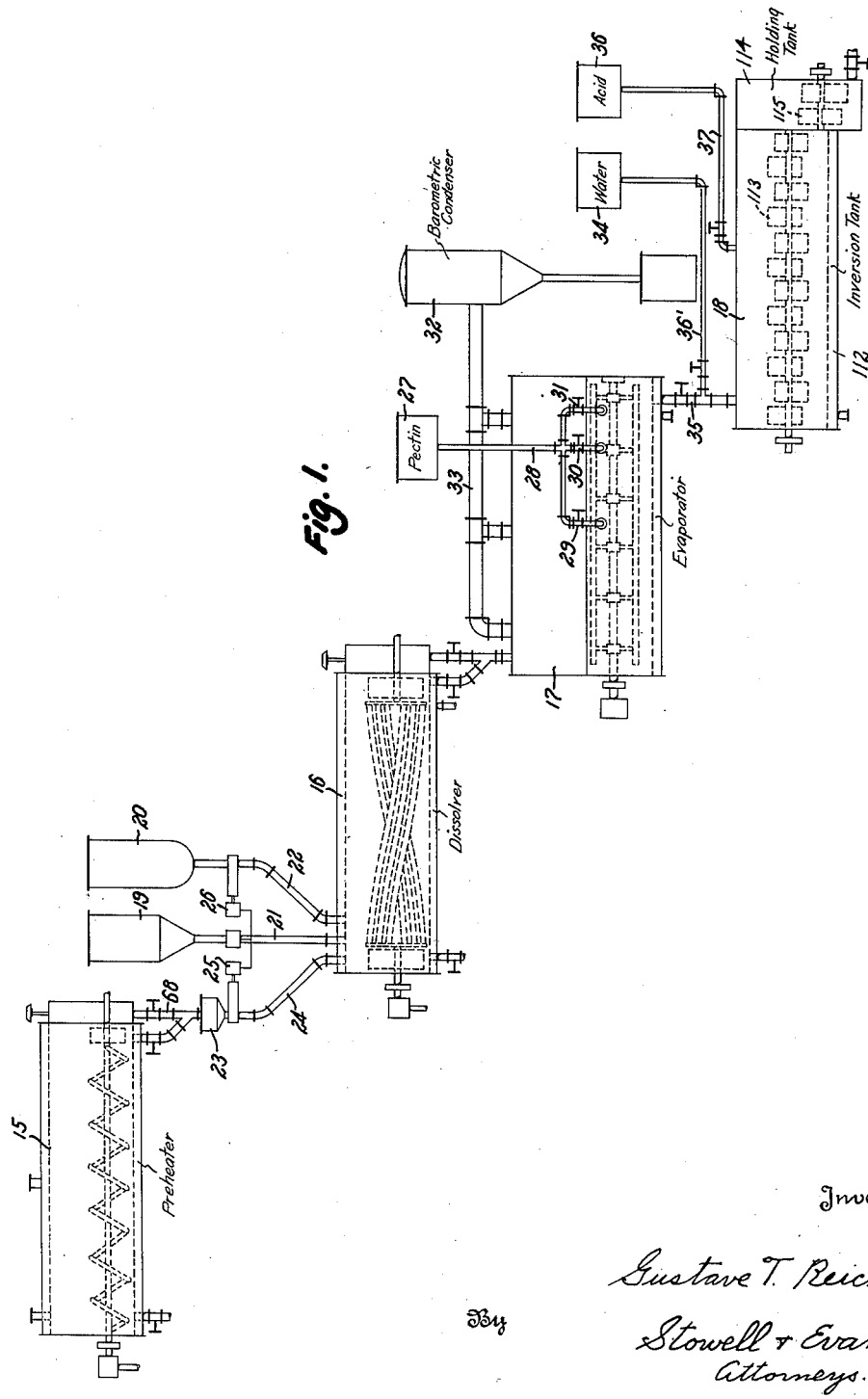
Fig. I.

May 26, 1953  G. T. REICH  2,639,898
APPARATUS AND METHOD FOR MIXING FOOD PRODUCTS
Filed Jan. 14, 1948  4 Sheets-Sheet 3
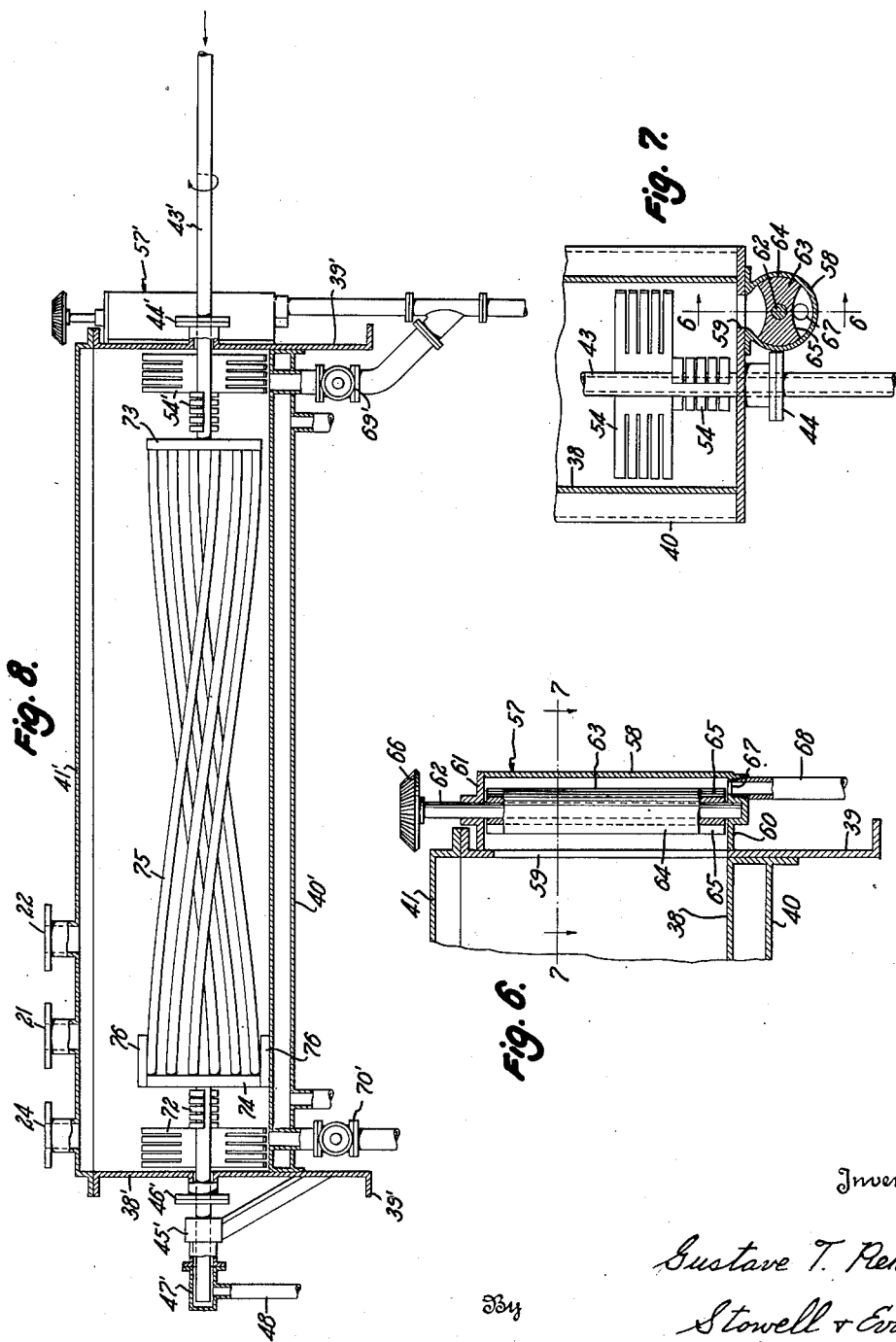
Inventor
Gustave T. Reich,
By Stowell & Evans
Attorneys.

May 26, 1953 G. T. REICH 2,639,898
APPARATUS AND METHOD FOR MIXING FOOD PRODUCTS
Filed Jan. 14, 1948 4 Sheets-Sheet 4
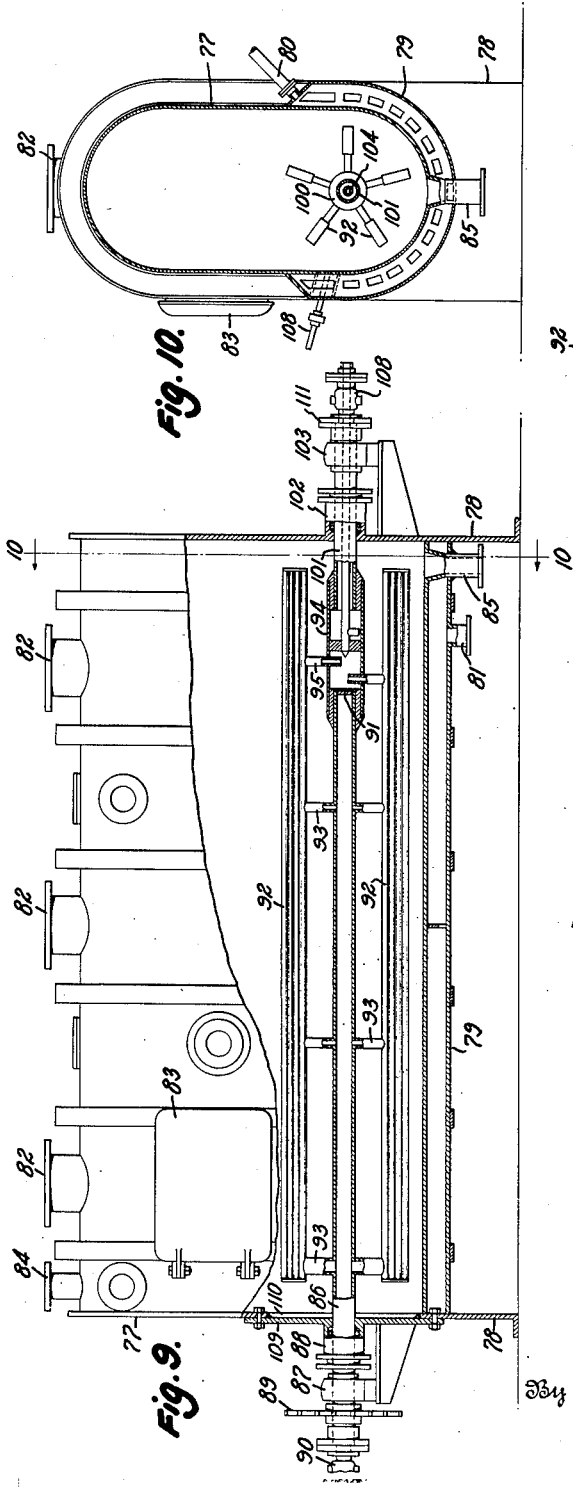
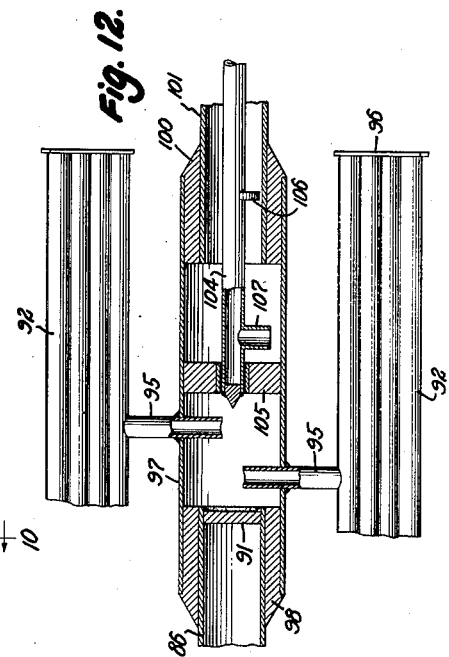
Inventor
Gustave T. Reich,
Stowell & Evans,
Attorneys.

Patented May 26, 1953

2,639,898

UNITED STATES PATENT OFFICE 2,639,898

APPARATUS AND METHOD FOR MIXING FOOD PRODUCTS

Gustave T. Reich, Philadelphia, Pa.

Application January 14, 1948, Serial No. 2,207

8 Claims. (Cl. 257—83)

This invention relates to methods and apparatus for making marmalades, jellies, jams, preserves, and the like.

An object of the invention is to provide a process and apparatus for the manufacture of marmalades, jellies, jams, and similar foodstuffs that permit of continuous large-scale operations and in which accurate control of rates of flow and composition are attained. Uniformity of product is also assured.

Another object is to provide a process and apparatus of this character wherein the cooking of the saccharine fruity mixture, including the evaporative concentration thereof, is carried out at relatively low temperatures and yet rapidly whereby to insure good color, taste and appearance in the product and to substantially eliminate loss of volatile essential oils that lend desirable flavor and odor to the product.

Another object is to provide a process and apparatus of the type in question wherein any whole or crushed fruit in the mixture is thoroughly and uniformly impregnated with the syrup.

Yet another object is to provide a process for producing saccharine fruity foodstuffs and the like wherein heating and evaporation is performed in apparatus having relatively extensive heating surfaces in relation to the volume of liquid undergoing processing whereby to enable relatively low temperatures to be employed. It is characteristic of the process that at no stage does the temperature of the liquid exceed the atmospheric boiling point. Operation under such conditions preserves the activity of pectin and conserves essential oils.

Still another object is to provide a highly flexible process and apparatus that are capable of producing a wide variety of products such as clear jellies, marmalades containing citrus fruit peels, jams including crushed fruit, preserves wherein whole fruit or berries are present, and other products of a like nature. Such flexibility also extends to production rates.

A further object is to provide a process for making gelled saccharine fruity foodstuffs wherein the water content of the product is accurately adjusted in the final step to a preselected value.

Another object is to provide apparatus wherein the several steps including preheating, dissolving sugar, evaporating and inverting sugar are performed in separate zones under optimum conditions appropriate to each step.

Another object is to provide apparatus and a process for preventing segregation as between zones of components of a food mixture undergoing processing in a series of zones.

Another object is to provide a food processing unit including a unique discharge device that insures uniformity of discharge from the unit.

Another object is to provide a foodstuffs processing unit having an improved agitating device that may include means for heating the agitating device.

Yet another object is to provide a process for cooking and evaporating gelled saccharine fruity foodstuffs mixtures including the step of adding pectin to the mixture in such a manner that the pectin is subjected to a minimum of heating whereby to preserve the gelling power of the pectin to a maximum degree.

In general, the invention provides a process and apparatus for the integrated continuous production of gelled saccharine, fruity foodstuffs.

The apparatus of the invention comprises an integrated combination of subcombination units including (1) a preheater in which the raw fruity materials may be raised from storage temperature to a temperature suitable for subsequent processing, (2) a dissolver in which sugar may be added to preheated raw fruity material and dissolved in the liquid component thereof, (3) an evaporator, particularly a vacuum evaporator, in which cooking and concentration is carried out and in which pectin may be added, and (4) an inverter wherein sugar is hydrolyzed, the foodstuff is subjected to pasteurizing conditions, and fruit acid, such as tartaric, malic, or citric acid, may be added to the material being processed. The apparatus also includes accessory equipment to be described in detail hereinafter.

In particular, the preheater and dissolver of the invention may include an elongated tank, an agitator in the tank comprising a horizontal shaft, a tubular agitator member carried by the shaft and helically disposed thereabout, and means for circulating heating fluid through the tubular member. These units may also have outwardly extending paddle blades carried by the shaft near the outlet end of the tank.

Also, the preheater and dissolver may include, in combination, a processing tank and a discharge device therefor comprising means providing a slot in a wall of the tank extending from a point adjacent to the bottom of the tank to a point above the normal working level of fluent material in the tank, and a discharge valve opening into the tank along substantially the entire length of the slot. Germane to this concept, the method involves the processing of fluent materials subject to stratification comprising continuously passing fluent material through an elongated treating zone and continuously removing fluent material from one end of the treating zone along a relatively narrow path extending substantially entirely across the stratified layers of the fluent material.

In addition to the characteristics of the dissolver, as generally described hereinbefore, the dissolver tank preferably has a semi-cylindrical bottom portion adjacent to the inlet end of the tank and scaper blades carried by the agitator shaft in scraping relation to the semi-cylindrical bottom portion of the tank.

The evaporator unit is characterized by a tank and a rotatable agitator in the tank, the agitator comprising a horizontal shaft, a plurality of elongated blades, means mounting the blades in spaced relation on and longitudinally of the shaft, blades being spaced circumferentially of the shaft and having warped surfaces providing longitudinally extending grooves. Means for heating the blades is included by preference. Preferably also, the evaporator is of the vacuum type.

In its method aspects, the invention involves several features of importance.

In the production of gelled, saccharine, fruity foodstuffs, one of these features includes adjusting the water content of a cooked mixture containing fruit juice and sugar to an amount greater than that desired in the finished product and thereafter subjecting the mixture to sugar inversion conditions until sufficient water has been taken up by the inversion of sugar to reduce the water content to the desired point.

Another of these features includes continuously passing a solution including sugar and fruity material through an elongated concentrating zone, concentrating the solution as it passes through said zone by progressively evaporating water therefrom to produce a solution having a water content substantially equal to that desired in the product issuing from said zone, continuously adding an aqueous solution of pectin to the thus concentrated solution, and subjecting the pectin containing solution to further concentration by progressively evaporating additional water therefrom until the solution reaches the final desired water content.

Other features of the invention will appear in the more detailed description thereof to follow.

The invention will be described with greater particularity and other of its aims, objects and advantages will be in part apparent and in part pointed out in the following detailed description taken in connection with the accompanying drawings, wherein:

Fig. 1 is a somewhat diagrammatic elevational view of a typical combination of apparatus in accordance with the invention;

Fig. 2 is a vertical longitudinal sectional view of the preheater of Fig. 1;

Fig. 3 is an elevational view of the discharge end of the preheater of Fig. 2;

Figs. 4 and 5 are enlarged detail side and end views respectively of an agitator of the preheater;

Fig. 6 is an enlarged vertical sectional view of a discharge valve taken along the plane of the line 6—6 of Fig. 7;

Fig. 7 is a sectional view taken along the plane of the line 7—7 of Fig. 6;

Fig. 8 is a vertical longitudinal sectional view of the dissolver of Fig. 1;

Fig. 9 is a longitudinal elevational view of the evaporator of Fig. 1, parts being broken away to show interior construction;

Fig. 10 is a sectional view taken along the plane of the line 10—10 of Fig. 9;

Fig. 11 is an enlarged transverse sectional view of the agitator for the evaporator shown in Figs. 9 and 10; and Fig. 12 is a still further enlarged longitudinal sectional view of the heating fluid outlet end of the agitator of Fig. 11.

The combined apparatus

Referring to Fig. 1, the typical apparatus shown includes a preheater 15, a dissolver 16, an evaporator 17, and an inversion tank 18.

The apparatus also includes a storage bin 19 for granulated sugar and a tank 20 for holding sucrose syrup or syrup partly or completely inverted. Granulated sugar is fed to the inlet end of the dissolver through a pipe 21. Syrup is fed to about the same point through a pipe 22 and material from the preheater is also fed to the dissolver from a holding tank 23 through a pipe 24. Rates and relative proportions of the components from the preheater, the sugar bin and the syrup tank are controlled by proportional feeding devices 25 and 26 that may be regulated to control the rate of feed from the holding tank 23 and the proportional rates of feed of sugar and/or syrup from the bin 19 and the tank 20.

Also included in the apparatus as shown in Fig. 1 is a tank or hopper 27 for holding pectin or pectin solution which is fed to the evaporator 17 through a pipe 28 having valved outlets 29, 30 and 31 positioned to discharge pectin at longitudinally spaced points in the evaporator. The evaporator 17 is connected to a barometric or other condenser 32 by a pipe 33 for vacuum operation.

A water tank 34 is also provided. The water tank is connected to the conduit 35 by a valve-controlled pipe 36 for the introduction of controlled quantities of water into the concentrated mixture flowing from the evaporator 17 to the inversion tank 18.

A reservoir 36 has a pipe 37 leading to a selected point in the inversion tank. The tank holds acid, particularly fruit acid, for introduction into the inversion tank 18 to increase the rate of inversion.

A description of the operation of the apparatus will be deferred until after the subcombination units of the assembly have been described.

The preheater

The preheater 15 will be described with reference to Figs. 2 and 3. Some of its components are shown in Figs. 4 through 7.

Referring particularly to Figs. 2 and 3, the preheater illustrated has an elongated horizontal tank 38 supported on standards 39. The bottom of the tank is semi-cylindrical and is provided with a heating jacket 40 through which a heating fluid such as steam or hot water may be circulated. The tank is provided with a top or cover 41 that may be removed to give access to the tank for cleaning or servicing purposes. A nipple 42 provides an opening in the cover through which $CO_2$ or other inert gas may be introduced to form a protective atmosphere in the preheater, or the nipple may be left open to the ambient atmosphere where the latter will have no deleterious effect on the foodstuff being processed.

The preheater has a longitudinally extending agitator including a shaft 43 protruding through the end walls of the tank and supported at the right in a combination bearing and stuffing box 44 and at the left in a bearing 45 and a stuffing box 46. The shaft 43 is tubular and its open left end terminates in an outlet box 47 affixed to the bearing 45. The box has a drain 48 for the removal of fluid therefrom.

The agitator includes a tubular helical coil 49 concentrically surrounding the shaft 43 within the tank and attached to the shaft 43 at the points 50 and 51. The interior of the coil is in communication with the interior of the shaft and partitions 52 and 53 may be placed in the shaft 43 to direct fluid flow entirely through the coil and to prevent fluid flow in that part of the shaft included between the partitions. Or the partitions 52 and 53 may have restricted openings therethrough to divide the flow of fluid between the coil and the included shaft section.

Conventional drive means (not shown) is provided for rotating the shaft in the direction of the arrow of Fig. 2 and a suitable fluid inlet valve is provided at the right-hand end of the shaft. It will be seen that a heating fluid such as steam may be passed through the interior of the agitator from right to left as seen in Fig. 2 for the purpose of heating the contents of the preheater tank.

At the right-hand or discharge end of the tank 38, the shaft 43 carries a pair of mixing paddles 54. The paddles are disposed at right angles to each other and extend radially of the shaft for a distance slightly greater than the radius of the coil 49.

As shown in detail in Figs. 4 and 5, the paddles are formed of sheet stock and may be welded to the shaft 43. The outer ends of the paddles are divided by spaced radial slots 55 into a plurality of parallel fingers 56, the tips of which are curved in the direction of rotation of the paddles.

The right-hand end of the preheater has a discharge device 57, the primary purpose of which is to withdraw stratified material, or material that is not homogeneous in the vertical direction, from the tank without segregating components of the material.

Referring to Figs. 6 and 7, showing the discharge device in enlarged detail, the discharge device or valve 57 has a vertical cylindrical casing 58 attached to the end wall of the tank 38 and communicating with the tank through a vertical slot 59. The valve casing has a bottom closure member 60 and a top closure member 61 provided with bearings supporting a vertical shaft 62 concentrically of the casing. The shaft carries a valve element 63 that has cylindrical surfaces 64 slidably engaging the interior walls of the casing and opposed vertically recessed portions 65 that co-act with the side walls of the valve casing to provide vertically extending pockets. A bevel gear 66 on the end of the shaft 62 serves, through suitable co-acting gearing (not shown), to rotate the shaft and valve element 63 at any desired rate.

In rotation, the recessed portions 65 of the valve element pick up vertically extending sections of liquid from the tank 38 and transport them through 90° of rotation to a point over the valve outlet 67 through which they are discharged into the conduit 68. It will be seen that, for a valve of given pocket size, the discharge rate can be varied as desired by varying the rate of rotation of the shaft 62. It will also be seen that regardless of stratification or lack of vertical uniformity in the liquid contained in the tank 38, the liquid discharged from the tank by the valve device 57 has the same average composition as the liquid contained in the tank at the slot 59. Since vertical transverse sections of the liquid taken longitudinally of the tank have approximately the same average composition, it will be seen that the discharge from the tank does not change the average composition of the liquid in the tank and that segregation is thus avoided.

Drain cocks are located at 69 and 70. These are normally closed in operation but are opened during flushing of the tank.

The preheater provides a device having a relatively large heating area per unit tank volume. The agitator has a coil portion that produces very gentle agitation in the liquid or liquid suspension flowing through the tank. Such agitation is insufficient to break or damage whole fruit in liquid suspension and is insufficient to thoroughly mix a suspension of fruit and juice. However, the helical conformation of the coil tends to move a stratified suspension from left to right through the tank and to give enough mixing to insure uniform heating and to prevent localized overheating. In operation, either or both of the agitator coil 49 or the heating jacket 40 may be supplied with heating fluid.

Paddles 54, located between the end of the coil and the outlet end of the tank, produce some mixing of the tank contents just prior to discharge.

The dissolver

Details of the dissolver are shown in Fig. 8. Many of the parts of the dissolver are identical with corresponding parts of the preheater previously described. These parts will be designated in Fig. 8 by corresponding primed reference numerals, and detailed description thereof will not be necessary.

The dissolver differs from the preheater primarily in the construction of the agitator. In the dissolver, the shaft 43' carries agitator paddles 72 at the inlet end. The paddles are identical to the paddles 54' near the outlet end of the tank and serve to preliminarily mix the materials introduced into the tank.

The heated coil includes a pair of hollow header discs 73 and 74, between which the helical tubes 75 are supported to form a squirrel-cage agitator assembly. Steam or other heating medium is passed into the right-hand end of the shaft 43' and conducted to the header disc 73, thence through the tubes 75 to the header disc 74 and to discharge.

Arranged about the periphery of the header disc 74 are a plurality of circumferentially spaced scraper blades 76 that slide along or close to the semi-cylindrical bottom of the tank 38' and remove undissolved sugar and other solids that may adhere to the bottom of the tank. Such adherence is likely to occur in the zone in which the granulated sugar is fed to the tank and the scrapers are preferably located directly beneath the sugar inlet.

It will be observed that the pitch of the helical coil members 75 is much greater than the pitch of the coil 49 of the preheater. This produces a relatively greater degree of rotary agitation in the dissolver than in the preheater, which is a condition desired in order to increase the rate of solution of the sugar. Although the longitudinal translatory component of force exerted by the dissolver agitator is less than that exerted by the preheater agitator, it is sufficient to move jam or preserve mixtures, as ordinarily encountered, through the tank.

The evaporator

The evaporator is illustrated in Figs. 9 and 10 and certain details thereof are shown in Figs. 11 and 12.

Referring to Figs. 9 and 10, the evaporator has an elongated enclosed tank 77 supported on legs 78. The semi-cylindrical bottom of the tank is provided with a heating jacket 79 having a steam inlet 80 and a condensate outlet 81. At the top of the tank are located the flanged couplings 82 that are connected to a vacuum line leading to a condenser. The tank has a door 83 giving access to the interior of the tank.

An inlet coupling 84 is located on the top of the tank at the left end as seen in Fig. 9 and an outlet 85 communicates with the bottom of the tank at the right.

The evaporator includes a heated agitator having a hollow driven shaft section 86 journalled in a bearing 87 and extending into the evaporator through a stuffing box 88. A sprocket wheel 89 carried by the shaft section 86 is driven by a powered chain (not shown).

Steam or other heating fluid is admitted to the shaft section 86 through a revolving fitting 90 and may flow through the shaft section only as far as the plug 91 located at the right-hand end of the shaft section.

Hollow agitator blades 92 are mounted on tubular radially extending arms 93 carried by the shaft section 86. Heating fluid may flow from the shaft section into the blades through the radial tubes 93. Condensate from the blades is carried to a trap 94 through the tubes 95.

As best seen in Figs. 11 and 12, the agitator blades 92 are in the form of elongated hollow envelopes disposed parallel to the axis of rotation of the agitator. The ends of the blades are closed by plate members 96 and the side walls of the blades are longitudinally corrugated to provide increased heating surface and a warped external surface that will catch floating pieces of fruit and carry them down into the body of liquid in the tank.

Referring particularly to Fig. 12, the condensate trap includes a cylindrical casing 97 supported at one end by the bushing 98 carried by the shaft section 86. The other end of the casing is similarly supported by a bushing 100 carried by the shaft extension 101. The casing, bushings and shaft members are welded together to form a unitary shaft structure including the trap 94.

As shown in Fig. 9, the shaft extension 101 passes through a stuffing box 102 and is journalled in a bearing 103.

Condensate received in the trap is removed therefrom through a stationary outlet pipe 104 that extends concentrically through the shaft extension 101. The plugged inner end of the outlet pipe rides in a spider 105 carried internally of the trap casing. Additional support for the outlet pipe is provided by a guide 106 welded to the outlet pipe and slidably engaging the interior of the shaft extension 101.

Condensate enters the outlet pipe from the trap through a depending nipple 107 and leaves the apparatus through a revolving joint 108.

It will be noted that the conduits 95 extend into the trap chamber nearly to the axis thereof in order to prevent condensate from flowing from the trap chamber into a conduit leading to an agitator blade below the trap. Also, the conduits 95 are staggered longitudinally of the trap chamber so that condensate will not drip or flow from a superjacent to a subjacent conduit and thus avoid being collected in the trap chamber.

A removable end plate 109 is bolted to the left end wall of the evaporator and supports the shaft bearing structure. When this plate is removed, the agitator assembly may be withdrawn through the opening 110 after removal of the flange coupling 111 and revolving joint 108 from the right-hand end of the shaft.

As in the preheater and dissolver, the ratio of heating surface to tank volume is relatively high which makes it possible to evaporate relatively large amounts of water in a short time without employing deleteriously high temperatures in the heating jacket or agitator.

It will be evidenced that the external warped surfaces of the agitator blades will function to immerse fruit whether or not the agitator is internally heated.

The inversion tank

Since this component of the apparatus is described and claimed in my copending application Serial No. 716,822, filed December 17, 1946, for Apparatus for Processing Food, it will not be necessary to describe it in detail here.

In brief, however, the inversion tank 18 has a heating jacket 112, as shown in Fig. 1, and an agitator 113. This component also has a holding tank 114 including an agitator 115. The holding tank has a heating jacket; it receives inverted jelly mixture or the like from the inversion tank and from it the mixture is passed to a machine (not shown) where the finished jelly is introduced into containers.

Operation

Although, as has been indicated, the apparatus of the present invention has wide flexibility in operation, its operation will be described in detail and by way of illustration with reference to the making of strawberry preserves.

Preliminarily to the making of the preserves, cleaned strawberries are mixed with from ¼ to ½ their weight of granulated sugar and the mixture is stored in barrels in a freezing house. In storage, the sugar gradually absorbs water from the strawberries. Upon thawing a barrel of sugar-strawberry mixture, two layers form. The upper layer consists of whole berries floating in syrup and the lower layer consists of clear fruit syrup. The amount of sugar present is less than that required in the final product and the floating strawberries contain less syrup than is needed to form a uniform preserve.

Thawed sugar-strawberry mixture is poured from the storage barrels into the preheater through the inlet pipe 71 and the preheater is filled to about the level of the top of the helical agitator coil 49. Heating fluid is turned into the heating jacket 48 and, if additional heat is needed, into the agitator also. The agitator shaft is rotated to stir the mixture and to exert a longitudinal translatory force on the mixture. When the sugar-strawberry mixture has been warmed to the desired temperature, which is variable but may be from about 120° F. to about 160° F., the discharge valve 57 is operated to discharge preheated strawberry-sugar mixture from the preheater 15. Additional mixture is fed to the preheater to maintain the liquid level substantially constant. Temperatures may be regulated by varying the temperature and/or rate of flow of the heating medium through the heating jacket and agitator.

Preheated sugar-strawberry mixture from the preheater is received in the holding tank 23. It is passed through the pipe 24 to the dissolver 16 at a rate controlled by the adjustable rate feeding device 25. Additional sugar is added to the mixture in the dissolver; such sugar may be added as granulated sugar from the bin 19 through the pipe 21 at a desired rate under control of the proportional feeding device 25. If more water is needed to provide a preserve mixture having the desired consistency and analysis, it may be added to the dissolver from the tank 20 in quantities controlled by the proportional feeding device 26.

After the level of the mixture in the dissolver has reached the top of the agitator therein, the agitator is rotated and steam or other heating fluid is admitted to the heating jacket 40' and to the agitator. The temperature of the mixture is raised to about 140° F. and thereafter the discharge device 57' is put in operation to remove mixture from the dissolver at a rate corresponding to the throughput rate of the system.

The sugar is dissolved near the inlet end of the apparatus to form a syrup. The paddles 72 and scrapers 76 assist in dissolving the sugar as explained hereinbefore in the detailed description of the dissolver.

Alternatively, sugar syrup may be added to the dissolver from the tank 20 to supply all or a part of the required sugar and water. The sugar syrup may be partly inverted.

The preliminary heating of the mixture in the preheater and dissolver causes displacement of much of the air in the strawberries thus eliminating excessive foaming in the evaporator.

From the dissolver, the preserve mixture passes to the vacuum evaporator 17. The evaporator is preferably operated under a vacuum of at least about 26'' of mercury. In this component of the apparatus, the preserve mixture is subjected to active boiling under reduced pressure. Here the mixture is cooked and some evaporation occurs. Here also, the fruit is subjected to repeated immersion in the fruit syrup and is substantially saturated with the syrup. Under the low temperature cooking conditions obtaining in the vacuum evaporator substantially no inversion of sugar occurs.

In the evaporator, liquid pectin is added as may be necessary to improve the setting qualities of the preserve. It may be added through any of the valves 29, 30 or 31 depending upon the amount required and the amount of evaporation needed to get rid of water contained in the pectin solution. In general, where large quantities of pectin solution are required, the pectin is added near the center of the tank through valve 29; and where minimal quantities are used, the pectin solution is introduced through the valve 31 near the outlet end of the tank.

It is highly desirable to subject the pectin to a minimum of heating in order not to adversely affect its gelling power. Also, in order to insure rapid and thorough mixing of the pectin with the mixture undergoing cooking and concentration, it is desirable to add the pectin in aqueous solution. According to my process, I continuously remove water from the mixture as it passes through the evaporator until a point is reached intermediate the feed and discharge ends of the evaporator where the water content of the mixture is substantially equal to the water content desired in the concentrated product to be discharged from the evaporator. At this point, I add the necessary pectin in water solution. I then continue evaporation in the apparatus until the water content of the pectin containing mixture is again reduced to the desired value. The concentrated mixture is then discharged from the evaporator.

In order to carry out the pectin addition phase of the process, I provide a plurality of pectin inlets spaced longitudinally of the evaporator from about its mid-point to near its discharge end. Thus, an appropriately positioned pectin inlet is available for the introduction of varying amounts of pectin solution that may be required by different foodstuffs to which the apparatus is adaptable.

In operation, the liquid in the evaporator just covers the agitator. The corrugated blades of the agitator catch the floating strawberries and submerge them in the fruit syrup thus insuring that the fruit is thoroughly impregnated with syrup. The corrugated blades are spaced from the agitator shaft to provide openings through which fruit may rise to the top of the liquid without being trapped next to the shaft and there subjected to undue heating.

Conditions in the evaporator are so controlled that the water content of the cooked preserve discharged therefrom is greater by a fixed percentage than that desired in the final preserve. Any adjustments that need to be made in water content are made prior to introduction of the cooked preserve into the inversion tank. If additional water is required, it is added from the reservoir 34 through the pipe 36.

The cooked preserve, properly adjusted as to water content is fed to the inversion tank. For example, the preserve mixture may be fed to the inversion tank at 66.5° Brix. In passing through the inversion tank the temperature is raised to about 180° F. and fruit acid may be added if necessary from the acid reservoir 36 to promote inversion. The degree of inversion is controlled by the temperature and time of holding the cooked preserve after addition of acid at the particular temperature. In the inversion process, water from the fruit syrup is taken up in the hydrolysis reaction and the percentage of free water is thus decreased resulting in a partially inverted fruit syrup having a higher soluble solids content. For example, the 66.5° Brix mixture fed to the inversion tank may be inverted until it gives a reading of 68.0° Brix. Since the percentage of water withdrawn from the syrup is directly proportional to the degree of inversion, it will be seen that the present process provides a convenient method of accurately finishing preserves or the like to a desired final concentration. In the process, adjustments are not required after the preserve leaves the inversion tank.

It will be understood that when some water is added with the fruit acid to the material undergoing inversion appropriate allowance will be made in the adjustment of the water content of the mixture fed to the inversion tank so that a finished product of the desired water content will be delivered from the inverter.

In the apparatus of the invention, jams and marmalades are produced by a process similar to the illustrative process as hereinbefore described.

The production of jellies is in some ways simpler, for jellies contain no suspended solids. In making jellies, the preheater may be dispensed with and the clear fruit juice, sugar and water may be introduced directly into the dissolver which functions not only to dissolve the sugar but also to raise the temperature of the jelly solution prior to introduction into the evaporator.

Owing to the fact that the units may be operated at various capacities and it is desired that the time factor of processing shall be the same, for instance, 1,000 up to 2,000 gallons per hour or more, the liquid levels in the inversion and holding tank are maintained and regulated to the desired quantities, so that a uniform rate of inversion is achieved.

Another important feature of this process is that if, for one reason or other, trouble with the filling machine should occur and the liquid level in the holding tank rises to a predetermined maximum height, all units are shut down automatically. Otherwise, liquid level in other units would rise too high and the much wanted uniformity of the product would not be attained.

From the foregoing description it will be seen that the present invention provides apparatus and a process for producing foodstuffs, particularly those of a gelled, sweet, fruity character such as jellies, jams, marmalades and preserves, which are economical to operate and which yield uniform products of high quality.

I claim:

1. Apparatus for processing fluent foods comprising a tank, and a rotatable agitator in said tank, said agitator comprising a horizontal shaft, a plurality of radially extending blades, means fixedly mounting said blades on said shaft and radially spaced therefrom, said blades extending for a substantial distance longitudinally of said shaft, being spaced circumferentially of said shaft and having warped surfaces providing longitudinally extending grooves.

2. Apparatus for processing fluent foods comprising a tank, a rotatable agitator in said tank, said agitator comprising a horizontal shaft, a plurality of elongated radially extending blades, means fixedly mounting said blades on said shaft and radially spaced therefrom, said blades extending for a substantial distance longitudinally of said shaft, being spaced circumferentially of said shaft and having warped surfaces providing longitudinally extending grooves, and means for heating said blades.

3. Apparatus for processing fluent foods comprising a tank, a rotatable agitator in said tank, said agitator comprising a horizontal shaft, a plurality of elongated blades, means mounting said blades in spaced relation on and longitudinally of said shaft, said blades being spaced circumferentially of said shaft and having warped surfaces providing longitudinally extending grooves, said blades having internal conduits, and means for circulating heating fluid through said conduits.

4. Apparatus for processing fluent foods comprising an elongated horizontal enclosed tank, means at the top of said tank for connecting an evacuator thereto, means providing a heating jacket at the lower part of said tank, a rotatable agitator in said tank, said agitator comprising a horizontal shaft, a plurality of elongated blades, each blade having an internal heating fluid chamber, at least two pipes communicating with the chamber of each blade at spaced points and attached to said shaft to mount the blade in parallel spaced relation to said shaft, heating fluid inlet means in said shaft communicating with one of said pipes and heating fluid outlet means in said shaft communicating with the other of said pipes, said blades being spaced circumferentially of said shaft and having warped surfaces providing longitudinally extending grooves.

5. In apparatus for processing fluent materials subject to stratification, the combination with a processing tank of a discharge device for said tank comprising means providing a slot in a wall of said tank, said slot extending from a point adjacent to the bottom of said tank to a point above the normal working level of fluent material in said tank, and a discharge valve comprising a substantially cylindrical casing having an inlet slot coextensive with and in communication with the slot in said tank wall, a complementary cylindrical valve member slidably engaging the interior walls of the casing, a vertically disposed recessed portion co-acting with the side walls of said casing to provide a vertically extending pocket co-extensive with the inlet slot in said casing, an outlet port in said casing located at a point remote from the inlet slot, and means for rotating the cylindrical valve member to transport vertically extending sections of fluent material from said inlet slot to said outlet port.

6. Apparatus for processing fluent foodstuffs subject to stratification which comprises an elongated horizontal tank having an inlet end and an outlet end, agitator means in said tank comprising a horizontal shaft extending between said ends of the tank, said agitating means including a first agitator blade carried by said shaft in spaced relation thereto and extending from a point adjacent the inlet end of said tank to a point spaced somewhat from the outlet end of said tank and a second agitator blade of substantially lesser axial extent and substantially greater radial extent than said first blade carried by said shaft between the outlet end of said tank and the end of said first agitator blade that is adjacent the outlet end of said tank, and discharge means at the outlet end of said tank comprising means providing a slot in the outlet end of said tank, said slot extending from a point adjacent the bottom of said tank to a point above the normal working level of fluent foodstuff in said tank, and a discharge valve opening into said tank along substantially the entire length of said slot.

7. In a method of processing fluent foodstuffs subject to stratification, the steps comprising continuously passing a fluent foodstuff through an elongated treating zone, relatively gently agitating the fluent foodstuff from a point adjacent the inlet end of said zone to a point spaced somewhat from the outlet end of the zone, agitating the fluent foodstuff more vigorously adjacent the outlet end of the zone, and continuously removing fluent foodstuff from the outlet end of the zone along a relatively narrow path extending substantially entirely across the outlet end of the zone.

8. In apparatus for processing fluent materials subject to stratification, a processing tank, a discharge device for said tank comprising means providing a slot in a wall of said tank, said slot extending from a point adjacent to the bottom of said tank to a point above the normal working level of fluent material in said tank, and a discharge valve comprising a substantially cylindrical casing having an inlet slot co-extensive with and in communication with the slot in said tank wall, a complementary cylindrical valve member slidably engaging the interior walls of the casing, opposed vertically disposed recessed portions co-acting with the side walls of said casing to provide opposed vertically extending pockets co-extensive with the inlet slot in said casing, an outlet port in said casing communicating with one of the recessed portions when the inlet slot is in communication with the other of the recessed portions, and means for rotating the cylindrical valve member to transport vertically extending sections of fluent materials from said inlet slot to said outlet port.

GUSTAVE T. REICH.

References Cited in the file of this patent

UNITED STATES PATENTS

| Number | Name | Date |
|---|---|---|
| 20,730 | Rose | July 29, 1858 |
| 299,370 | Fletcher et al. | May 27, 1884 |
| 631,549 | Talcott et al. | Apr. 22, 1899 |
| 891,468 | Dougan | June 23, 1908 |
| 993,269 | Mowers | May 23, 1911 |
| 1,175,876 | Sinclair | Mar. 14, 1916 |
| 1,334,495 | Jackson | Mar. 23, 1920 |
| 1,365,916 | Horstmann | Jan. 18, 1921 |
| 1,369,494 | Faulconer | Feb. 15, 1921 |
| 1,429,834 | Bielmann | Sept. 19, 1922 |
| 1,451,135 | Wright et al. | Apr. 10, 1923 |
| 1,641,328 | Ferdinand | Sept. 6, 1927 |
| 1,717,465 | O'Meara | June 18, 1929 |
| 1,999,411 | Haney | Apr. 30, 1935 |
| 2,009,734 | Hiller et al. | July 30, 1935 |
| 2,382,605 | Carter | Aug. 14, 1935 |